United States Patent [19]
Caroff

[11] 4,070,915
[45] Jan. 31, 1978

[54] DEVICE FOR FIXING VEHICLE WHEELS ON A WHEEL-BALANCING MACHINE

[75] Inventor: Yves Robert Caroff, Saint Mande, France

[73] Assignee: Facom, Villeneuve le roi, France

[21] Appl. No.: 736,488

[22] Filed: Oct. 28, 1976

[30] Foreign Application Priority Data

Dec. 4, 1975 France .................................. 75 37097

[51] Int. Cl.² ............................................. G01M 1/02
[52] U.S. Cl. .................................. 73/487; 144/288 A
[58] Field of Search ................. 73/487, 482, 483, 485; 144/288 A; 157/1.11, 1.24

[56] References Cited

U.S. PATENT DOCUMENTS

| | | | |
|---|---|---|---|
| 3,349,626 | 10/1967 | Palacios | ................................. 73/487 |
| 3,995,498 | 12/1976 | Curchod et al. | ................... 73/487 X |

FOREIGN PATENT DOCUMENTS 1,134,043  11/1956  France .................................... 73/487

Primary Examiner—James J. Gill

[57] ABSTRACT

Device for fixing a vehicle wheel on a balancing machine comprising a platen to be fixed at its center on the rotary shaft of the balancing machine. A series of passages having axes parallel to the axis of rotation of the shaft are formed in the platen, the axes being located at the angles of at least two regular polygons. There is provided a set of cranks each having a journal for engagement in a corresponding one of the passages and a stud eccentric with respect to the journal for engagement in one of the fixing operations of the wheel. A mechanism simultaneously drives all the cranks upon rotation of one of the cranks so that the studs of the cranks are at a distance from the center of the platen which is equal to the distance between the fixing apertures and the center of the wheel. One of the passages constitutes an angle common to all the polygons and all the passages are located on the same circumference on the platen.

28 Claims, 8 Drawing Figures

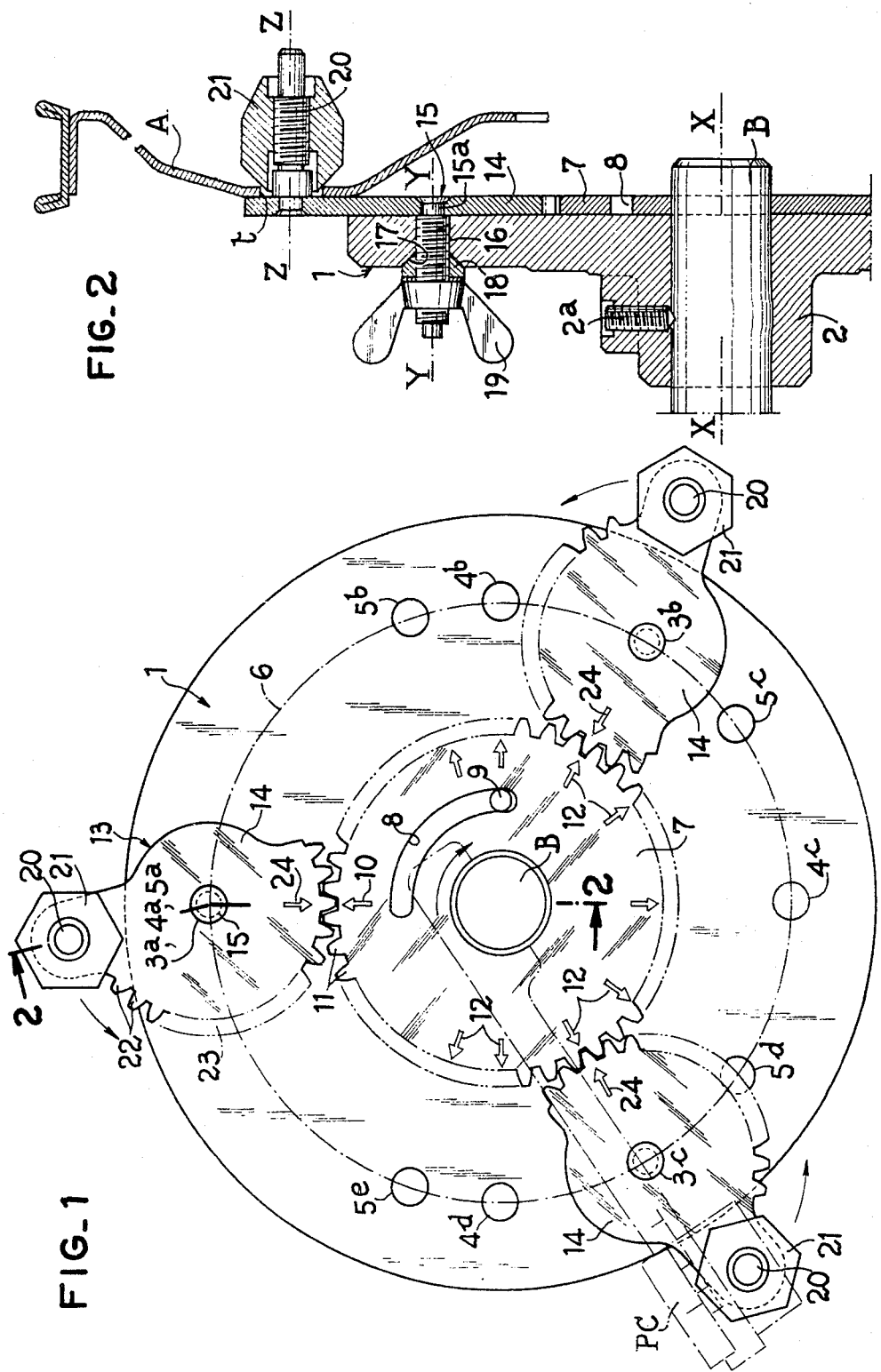

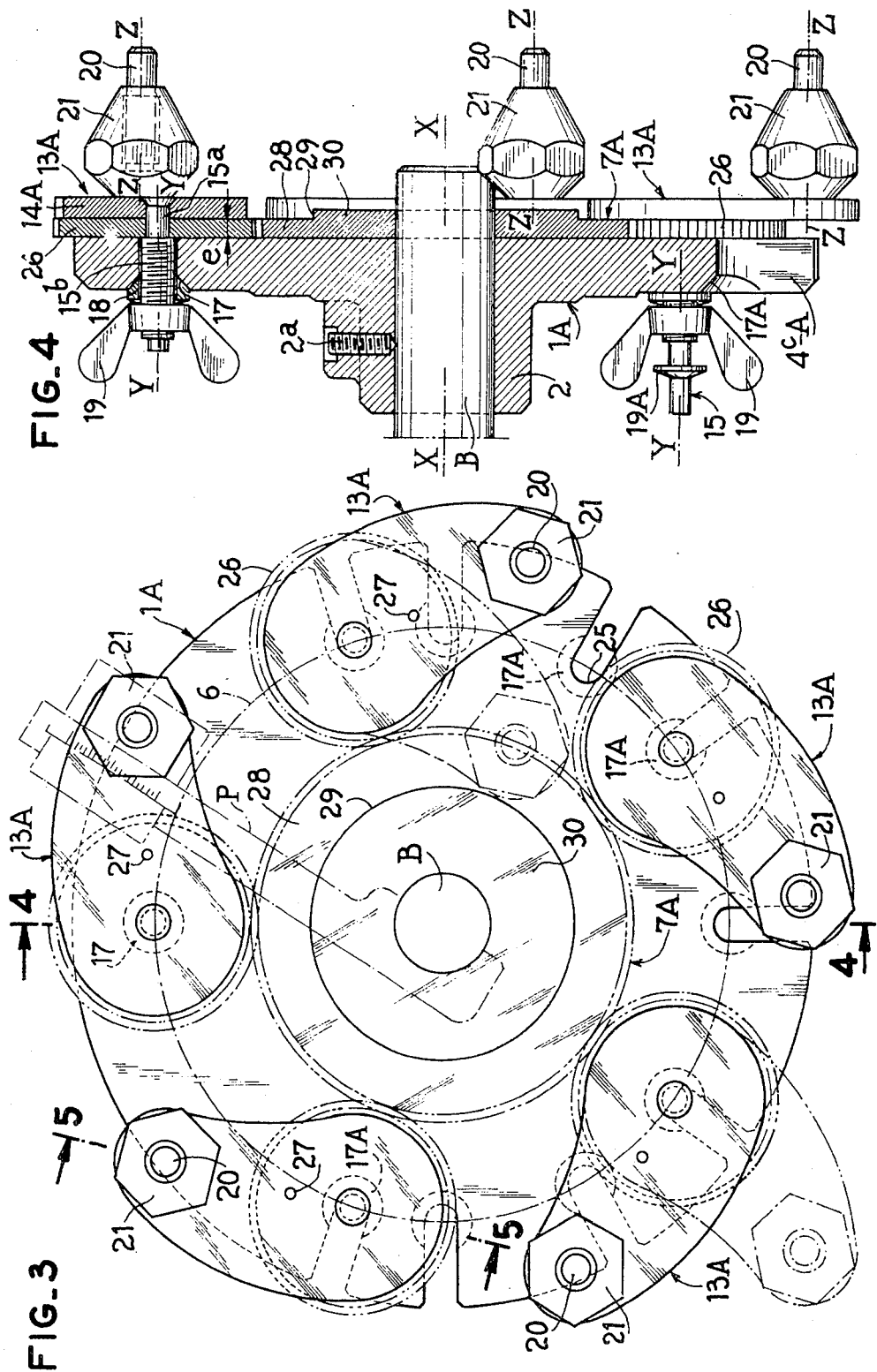

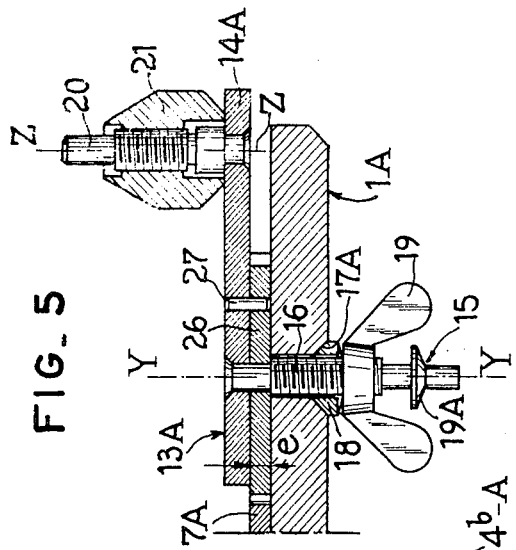
FIG_5
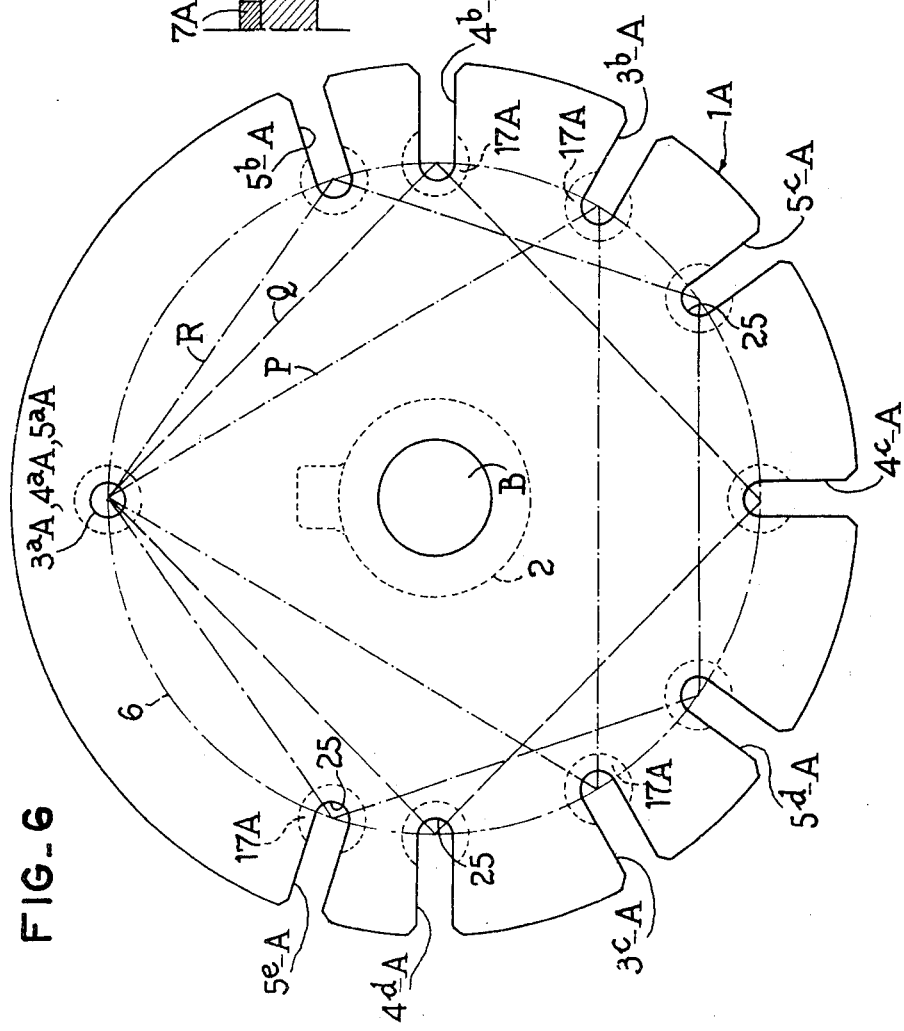
FIG_6

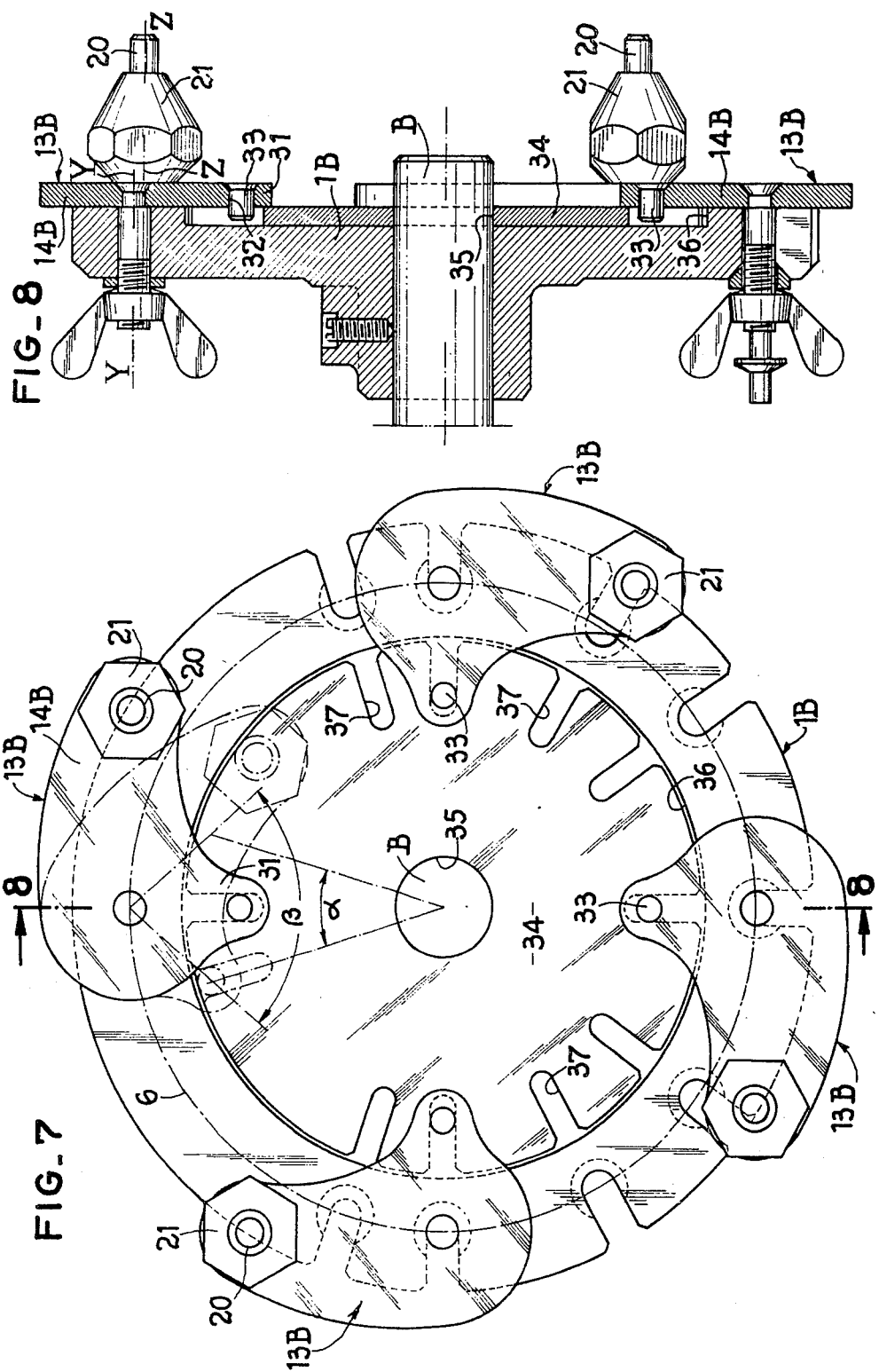

DEVICE FOR FIXING VEHICLE WHEELS ON A WHEEL-BALANCING MACHINE

The present invention relates to the balancing of vehicle wheels which comprises, in the known manner, fixing on the wheel one or more weights adapted to compensate for the imbalance which this wheel may have and which might be harmful to the latter in the course of its rotation.

A balancing machine which permits the determination of both the magnitude of the imbalance and the angular position of the latter on the wheel usually comprises a rotary shaft with which measuring means are associated and on which a device termed a plate or platen is keyed, this plate supporting the wheel in the curse of the balancing operation. This device is provided with a number of studs which are adpated to be introduced in the fixing apertures normally provided on the wheel for securing it to the hub of the vehicle. It is known that the number and position of the apertures for fixing a vehicle wheel vary from one type of wheel to another and that, in fact, for each make of vehicle, these two factors are different. For example, as concerns the number of apertures, wheels exist which have three, four, five and six apertures.

In order to render the mounting of the wheels on the balancing machine more convenient, effects have been made for some time to construct universal platens which may be adapted by a simple operation to any type of vehicle wheel, but up to the present time, to applicant's knowledge, this object has not been attained.

Thus fixing devices exist which are provided with a platen on which rotatable parts termed "cranks" may be mounted, each crank carrying an eccentric fixing stud which may be selectively mounted on the platen of the device in such manner as to be rotatable about axes parallel to the main axis of the platen, the latter axis coinciding with the axis of the balancing machine (see in particular French Pat. No. 1,134,043 to the applicant and French Pat. No. 1,561,266).

Other devices are automatically adjustable owing to the fact that the "cranks" are in the form of links or discs and coupled together by a transmission mechanism so that, in positioning one of the cranks and its stud at the required radical distance for coinciding with a fixing aperture of the wheel, the other cranks automatically follow this adjustment and assume their own correct radial distance for coinciding with the corresponding apertures of the wheel to be mounted.

Thus, in particular, in respect of the device disclosed in French Pat. No. 1,236,422, there is provided a platen for a balancing machine comprising three series of apertures respectively in the number of three, four and five located on different circumferences. Engageable in these apertures are shafts of discs constituting "cranks", each of which carries a fixing stud and these discs are simultaneously driven by a friction drive comprising a centre part which is in contact, by a peripheral edge of rubber, with the peripheral edges of all the discs.

This platen has a number of drawbacks which are, in particular, the inaccuracy of the positioning of the studs owing to the friction drive and the necessity of changing, if it is desired to change from the balancing of one wheel having a given number of apertures to the balancing of a wheel having a different number of apertures, all the discs and the centre part which must have a different diameter depending on the number of studs employed.

An object of the present invention is to provide a device for fixing wheels on a balancing machine which avoids the drawbacks of known devices and in particular the device described in the patent just mentioned.

According to the invention, there is provided a device for fixing vehicle wheels on a balancing machine provided with a rotary shaft comprising in combination: a platen provided in the centre thereof with means for fixing it on said shaft and a series of passages respectively defined by axes parallel to the axis of the platen located at the angle of at least two regular polygons, a set of first means each of which first means is provided with a journal adapted to be engaged in one of the passages of the platen and a fixing stud which is eccentric with respect to said journal, and drive means for simultaneously driving all said first means so as to rotate, by the rotation of one of the first means, all the other first means, whereby the studs of the first means are located at a distance from the centre of the platen equal to the distance between the fixing apertures of the wheel to be balanced and the centre of said wheel, wherein one of said passages constitutes the angle common to all the polygons and said passages are all located on the same circumference of the platen.

Further features of the invention will be apparent from the ensuing description.

In the drawings, given solely by way of example:

FIG. 1 is a plan view of a fixing device according to a first embodiment of the invention;

FIG. 2 is a sectional view taken on line 2—2 of FIG. 1;

FIG. 3 is a plan view of a fixing device for a balancing machine according to a second embodiment of the invention;

FIGS. 4 and 5 are sectional views taken respectively on lines 4—4 and 5—5 of FIG. 3;

FIG. 6 is a plan view of the platen which is part of the device shown in FIGS. 3 to 5;

FIG. 7 is a view of a third embodiment, and

FIG. 8 is a sectional view taken on line 8—8 of FIG. 7.

With reference first to FIGS. 1 and 2, it can be seen that the device according to the invention is adapted to fix a wheel A, to be balanced, on a shaft B which is mounted to be rotatable about its axis X—X on a balancing machine. This wheel A comprises, at equal distances from the centre, a number of apertures $t$ which are adapted to secure the wheel in use on the usual studs carried by the hub of the wheel.

The illustrated device is adapted to permit the fixing of wheels having three, four and five apertures $t$, irrespective of the distances of these apertures from the centre of the wheels in question within given limits (note that the fixing of wheel having six apertures can be very easily envisaged with the use of only three of the six apertures).

The illustrated device comprises a platen or plate 1 having preferably a generally circular shape and provided with a centre hub 2 whereby the platen 1 may be fixed to the shaft B of the balancing machine by means of a radial screw 2a. The platen 1 has number of circular apertures 3a, 3b, 3c, 4a, 4b, 4c, 4d, 5a, 5b, 5c, 5d, 5e, the apertures 3a, 4a and 5a being coincident and constituting one and the same aperture which is hereinafter termed "pilot aperture". This aperture embodies the common apex or corner of three polygons, namely a triangle, a rectangle and a pentagon, the other angles of which are formed by the other apertures of the platen. As illustrated, the axes of all the apertures are parallel to the axis of the platen 1 and located on the same circumference 6 indicated in dot-dash line.

The platen 1 is engaged on the shaft B in such manner that the end of the latter protrudes slightly from the front face of the platen so as to be capable of receiving a centre gear wheel 7 which is freely rotatively mounted on the shaft to be driven in rotation about the axis X—X between angular limits determined by an arcuate slot 8 formed in the wheel 7 and a positioning pin 9 fixed in the platen 1. The gear wheel 7 carries a pilot reference 10 which is radially aligned with the axis of the pilot aperture 3a, 4a, 5a when one of the ends of the slot 8 abuts the pin 9. The number of teeth 11 of the gear wheel is a common multiple of 3, 4 and 5, and this number is preferably equal to the smallest of these multiples, namely 60. The gear wheel is also provided with nine other references 12 which are respectively aligned with each one of the apertures located on the circumference 6 when the wheel is in its initial position.

The device according to the invention also comprises a set of fixing means termed "cranks" 13, three, four or five of these cranks being adapted to be employed, depending on whether the wheel to be balanced has three (or six) apertures, four apertures or five apertures. Each crank 13 comprises a plate 14 with which there is fixed a pin 15 constituting a journal adapted to extend through one of the apertures of the platen 1 so as to be capable of rotating in the platen by a smooth portion 15a. The free end of each pin has a screw thread 16. Each aperture is chamfered at 17 on the rear face of the platen 1 so as to facilitate the centering of a frustoconical wide washer 18 engaged on the pin 15. A butterfly nut 19 is screwed on the pin 15. The axis Y—Y of the pin 15 is perpendicular to the general plane of the plate 14. Each crank 13 further comprises a stud 20 for fixing the wheel. This stud extends from the side of the plate 14 opposed to the side from which the pin 15 extends and its axis Z—Z is parallel to the axis Y—Y of the pin 15. The stud 20 receives a tightening nut 21 having part-conical end portions to ensure an improved centering on the fixing apertures of the wheel to be balanced. One of the edges of the plate 14 is arcuate and constitutes a toothed portion the teeth 22 of which are adapted to mesh with the teeth 11 of the gear wheel 7. The pitch circle of these teeth defines a circumference 23 outside which the stud 20 is located. One of the teeth adjacent the end of the plate 14 remote from the stud 20, corresponds to a reference 24.

The device just described is employed in the following manner:

The pin of the crank engaged in the aperture 3a, 4a, 5a can remain permanently therein and consequently, when the operation is started, for example with a wheel having three fixing apertures, the pins of the cranks 13 are mounted in in the apertures 3b and 3c while taking care to make the references 10 and 24 coincide, which brings the gear wheel 7 to the position shown in FIG. 1, and thereafter to make the references 24 of the other two cranks 13 to coincide with the references 12 corresponding to three apertures of the wheel 7. The butterfly nuts 19 of this moment remain still slightly untightened It is then necessary to measure the distance between the centre and the three wheel fixing apertues which may be effected by any means, for example by means of a calliper-square PC such as that shown in dot-dash line in FIG. 1. This calliper-square is thereafter applied against the end part of the shaft B and, by rotating the crank 13 of the pilot aperture 3a, 4a, 5a against the stud 20 of the latter. During this adjustment, the gear wheel 7 is driven in rotation together with the other two cranks 13 whose studs 20 will therefore automatically place themselves at the required radial distance from the axis X—X. The nuts 19 are then tightened and the wheel may be mounted by means of the nuts 21 and the balancing operation can now start.

In order to balance thereafter a wheel having four or five fixing apertures, the nuts 20 are unscrewed, the cranks 13 are returned to the initial position so that the pilot crank is in the illustrated position (the references 10 and 24 coincide) and the other two cranks are disassembled to place them with one or two other cranks 13 in the corresponding apertures of the platen while observing the references. The correct positioning of the studs 20 can then also be obtained, as before, in respect of a wheel having three apertures.

In the embodiment shown in FIGS. 1 and 2, it is shown that the centre gear wheel 7 and the cranks 13 are all in the same plane. In the embodiment which will now be described this is not the case. Indeed, for the purpose of increasing the angular travel of the studs, that is to say in order to allow mounting wheels whose fixing apertures are located at still more varied distances from the centre, the cranks are preferably located above the plane of the centre gear wheel.

In FIGS. 3 to 6, similar elements of the device carry the same reference characters as in FIGS. 1 and 2 and it can be seen that the device comprises a platen or plate 1A which is fixed, in a manner identical to that of the preceding embodiment, on the shaft B of a balancing machine. This platen comprises (FIG. 6) a pilot aperture 3a-4A, 4a-A, 5a-A, for the pilot crank 13A and nine notches 3b-A, 3c-A, 4b-A, 4c-A, 4d-A, 5b-A, 5c-A, 5d-A, 5e-A. These notches are disposed radially and terminate at their inner end in a part-circular wall 25 defined around an axis Y—Y which is the axis of rotation of a crank 13A when the latter is engaged in the corresponding notch. The axes Y—Y intersect the general plane of the platen at points which constitute the angles of polygons, namely a triangle P, a rectangle Q and a pentagon R (FIG. 6) having a common angle which is located on the axis of the pilot aperture 3a-A, 4a-A, 5a-A. The latter terminates in a frustoconical centering surface 17 on the rear face of the platen 1A and the ends of the notches define on this face centering surfaces 17A which are of course open. Note that the centering surface 17A may also be located in any region of the corresponding notch.

The device also comprises a centre driving gear wheel 7A and a set of a maximum of five cranks 13A. The latter are similar to those of the preceding embodiment as concerns the elements for securing it to the platen 1A and to a wheel to be balanced. However, the plates 14A of these cranks 13a are each fixed on a gear wheel 26 which is coaxial with the axis of rotation Y—Y of each crank and is prevented from rotation with respect to the plate by a small pin 27 (FIG. 5). Note that the thickness e of each gear wheel 26 is at least equal to the thickness of the peripheral portion 28 of the gear wheel 7A.

The centre gear wheel 7A also has a circular abutment 29 centered on the axis X—X of the platen 1A and constituted by the periphery of a centre raised portion 30 of the gear wheel 7A.

The device just described operates in a manner similar to the device shown in FIGS. 1 and 2. However, the following should be noted.

Whereas the pilot crank is engaged in one aperture of the platen and is intended to remain permanently therein, the other cranks are fixed to the end of the radial notches of the platen, which facilitates the assembly since the butterfly nut has no need to be completely unscrewed for mounting each crank; it is moreover for preventing loss of this butterfly nut that a retaining washer 19A is secured to the end of the pin 15.

The rotational travel of each crank is very great since the cranks can pass over the peripheral portion 28 of the centre gear wheel 7A without hindering the meshing of the latter with the gear wheels 26 of the cranks; consequently the platen is capable of being adapted to practically all types of conventional wheels, including those of small diameter, since the studs may be shifted very near to the axis X—X of the platen.

The references 10, 12 and 24 which were needed in the first embodiment are not needed in the presently-described embodiment, since the cranks may be positioned merely by applying them, upon assembly, against the circular abutment 29 as shown in dot-dash line in FIG. 3, the pilot crank being applied, before the assembly of the other cranks, by rotation against the abutment 29 which causes the centre gear wheel 7A to rotate toward its initial position. This results in a convenient and rapid assembly, irrespective of the number of cranks required for the balancing.

The embodiment shown in FIGS. 7 and 8 differs from that just described with reference to FIGS. 3 to 6 in that the transmission means between the pilot cranks and the other cranks are not constituted by gear wheels. In this embodiment, the platen 1B is substantially identical, but each crank 13B has a lateral tab portion 31 in which there is formed an aperture 32 receiving a pin 33 whose axis is parallel to the axis of rotation Y—Y of the crank. The gear wheel is in this case replaced by a circular disc 34 which is mounted to be rotatable by a centre aperture 35 on the end portion of the shaft B of the balancing machine and rests in a circular cavity 36 formed in the platen.

The circular disc 34 has notches 37 located at identical angular distances apart identical to those provided between the notches of the platen 1A. The width of the notches 37 is only very slightly greater than the diameter of the pins 33 of the cranks 13B. In this embodiment, the assembly of the cranks 13B can be achieved without previously positioning the pilot crank in its initial position, since the notches 37 allow only a single relative position of all the cranks.

In this embodiment, as soon as the required number of cranks have been placed in position, their suitable positioning or adjustment is achieved by the rotation of the pilot crank about the axis Y—Y, which drives through the pin 33 of the latter end and the corresponding notch 37 at the common angle of the polygons, the circular disc 34 which drives the other cranks 13B. It can be seen that the movement $\beta$ of the latter is limited by the abutment of the pins 33 against the wall of the cavity 36, the disc 34 then having rotated through an angle $\alpha$ defined by the position of the axis of the pin 33 in either of the extreme positions of the latter.

Note that the "cranks" described hereinbefore may be constructed in different ways. For example, they may be constituted by simple sufficiently thick plates capable of being tapped for the purpose of screwing studs having bases instead of the means 15, 16 and 20. Moreover, there may be envisaged the use of cranks specially adapted to wheels of unusual shape in lieu of the cranks described hereinbefore, which latter would be considered as "standard".

Further, the described embodiments all have a complete set of apertures enabling wheels having three, four, five and six apertures to be balanced. It will be understood that it is possible to envisage discs adapted solely for one or two of the types of wheels, for example combinations of apertures and cranks in the number of 3, 4, or 3, 5 or 4, 5.

It is possible to choose for the circle 6 (FIG. 1) a diameter corresponding to a diameter of a conventional wheel, for example a diameter of 140 mm. It is in this way possible to employ simple studs instead of cranks in the case of these wheels.

Having now described my invention what I claim as new and desire to secure by Letters Patent is:

1. A device for fixing vehicle wheels having fixing apertures on a balancing machine provided with a rotary shaft, comprising in combination: a platen provided in the centre thereof with means for fixing same on said shaft to rotate about the axis thereof and a series of passages respectively having axes parallel to said shaft axis and located repsectively at the apices of at least three regular polygons, comprising respectively a triangle, a square and a pentagon, a set of first means each of which first means comprises a journal adapted to be engaged in one of the passages of the platen and a fixing stud which is eccentric with respect to said journal, and drive means for simultaneously driving all of said first means so as to rotate, by the rotation of one of the first means, all the other first means, whereby the studs of the first means are located at a distance from the centre of the platen equal to the distance between the fixing apertures of the wheel to be balanced and the centre of said wheel, one of said passages constituting an apex common to all the polygons and said passages being all located on the same circumference of the platen.

2. A device as claimed in claim 1, wherein said passages are formed by circular apertures.

3. A device as claimed in claim 2, wherein one of the ends of each circular aperture is outwardly divergent and is defined by a coaxial part-conical centering surface.

4. A device as claimed in claim 3, wherein each of said first means comprises a centering washer which is engaged in said journal and is complementary with said centering surface.

5. A device as claimed in claim 1, wherein some of said passages are formed by radial notches opening onto the periphery of the platen, the axis of each of the passages being on the centre of a part-conical centering surface.

6. A device as claimed in claim 5, wherein said part-conical surface is coaxial with a part-cylindrical surface constituting an inner end of the corresponding notch.

7. A device as claimed in claim 6, wherein each fo said first means comprises a centering washer which is engaged on said journal and is complementary with said centering surface.

8. A device as claimed in claim 1, wherein the passage corresponding to said common apex is formed by a circular aperture termed "pilot aperture".

9. A device as claimed in claim 8, wherein one of the ends of each circular aperture is outwardly divergent and is defined by a coaxial part-conical centering surface.

10. A device as claimed in claim 1, wherein each of said first means comprises tightening means which are co-operative with said journal for selectively preventing the corresponding first means from rotating.

11. A device as claimed in claim 1, wherein said means for driving said first means comprise a centre driving element mounted to be rotatable about said shaft axis, and a positive mechanical connecting device being capable of coupling said driving element to each one of said first means.

12. A device as claimed in claim 11, wherein said positive mechanical connecting device comprises peripheral teeth on the driving element and complementary teeth on each one of said first means and meshing with the peripheral teeth.

13. A device as claimed in claim 12, wherein the number of teeth of the driving element is a common multiple of the numbers of apices of the respective polygons.

14. A device as claimed in claim 12, wherein each first means comprises a plate on which the journal and the stud are fixed in a manner to extend in opposed parallel directions and a part of the periphery of said plate defines said teeth, the plate being located in the same general plane as said centre driving element.

15. A device as claimed in claim 12, wherein each first means comprises a plate on which the journal and the stud are fixed in a manner to extend in parallel opposed directions and a gear wheel which is coaxial with the axis of the journal, meshes with said centre driving element and is integral with the plate, the plate being located at a different level with respect to said driving element and its associated gear wheel.

16. A device as claimed in claim 15, comprising on said centre driving element a circular abutment which is coaxial with said driving element and disposed at the same level as said plate in the mounted position of each one of said first means.

17. A device as claimed in claim 11, wherein said positive mechanical connecting device comprises a centre driving element constituted by a disc provided with radial notches disposed at angular distances apart which are identical to the angular distances apart of the passages of said platen, and each of said first means comprises a driving pin which is offset with respect to the journal of said first means and parallel thereto.

18. A device as claimed in claim 17, wherein said notches open onto the periphery of said disc.

19. In a device for fixing vehicle wheels having fixing apertures on a balancing machine provided with a rotary shaft, comprising in combination: a platen provided in the centre thereof with means for fixing same on said shaft to rotate about the axis thereof and a series of passages respectively having axes parallel to said shaft axis and located at the apices of at least two regular polygons, a set of first means each of which first means comprises a journal adapted to be engaged in one of the passages of the platen and a fixing stud which is eccentric with respect to said journal, and drive means for simultaneously driving all of said first means so as to rotate, by the rotation of one of the first means, all the other first means, whereby the studs of the first means are located at a distance from the centre of the platen equal to to the distance between the fixing apertures of the wheel to be balanced and the centre of said wheel; the improvement comprising arranging that one of said passages is coaxial with an apex which is common to all the polygons and said passages are all located on the same circumference of the platen, some of said passages being formed by radial notches opening on the periphery of the platen, the axis of each of the passages being on the centre of a part conical centering surface.

20. A device as claimed in claim 19, wherein said part conical surface is coaxial with a part cylindrical surface constituting an inner end of the corresponding notch.

21. A device as claimed in claim 20, wherein each of said first means comprises a centering washer which is engaged on said journal and is complementary with said centering surface.

22. In a device for fixing vehicle wheels having fixing apertures on a balancing machine provided with a rotary shaft, comprising in combination: a platen provided in the centre thereof with means for fixing it on said shaft to rotate about the axis thereof and a series of passages respectively having axes parallel to said shaft axis and located at the apices of at least two regular polygons, a set of first means each of which first means comprises a journal adapted to be engaged in one of the passages of the platen and a fixing stud which is eccentric with respect to said journal, and drive means for simultaneously driving all of said first means so as to rotate, by the rotation of one of the first means, all the other first means, whereby the studs of the first means are located at a distance from the centre of the platen equal to the distance between the fixing apertures of the wheel to be balanced and the centre of said wheel; the improvement comprising arranging that one of said passages is coaxial with an apex which is common to all the polygons and said passages are all located on the same circumference of the platen, said passages being formed by circular apertures, one end of each of which is outwardly divergent and is defined by a coaxial part-conical centering surface.

23. A device as claimed in claim 22, wherein each of said first means comprises a centering washer which is engaged on said journal and is complementary with said centering surface.

24. In a device for fixing vehicle wheels having fixing apertures on a balancing machine provided with a rotary shaft, comprising in combination: a platen provided in the centre thereof with means for fixing it on said shaft to rotate about the axis thereof and a series of passages respectively having axes parallel to said shaft axis and located at the apices of at least two regular polygons, a set of first means each of which first means comprises a journal adapted to be engaged in one of the passages of the platen and a fixing stud which is eccentric with respect to said journal, and drive means for simultaneously driving all of said first means so as to rotate, by the rotation of one of the first means, all the other first means, whereby the studs of the first means are located at a distance from the centre of the platen equal to the distance between the fixing apertures of the wheel to be balanced and the centre of said wheel; the improvement comprising arranging that one of said passages is coaxial with an apex which is common to all the polygons and said passages are all located on the same circumference of the platen, the passage correspnding to said common angle being formed by a circular aperture termed "pilot aperture", one of the ends of each circular aperture being outwardly divergent and defined by a coaxial part-conical centering surface.

25. In a device for fixing vehicle wheels having fixing apertures on a balancing machine provided with a rotary shaft, comprising in combination: a platen provided in the centre thereof with means for fixing it on said shaft to rotate about the axis thereof and a series of passages respectively having axes parallel to said axis and located at the apices of at least two regular polygons, a set of first means each of which first means comprises a journal adapted to be engaged in one of the passages of the platen and a fixing stud which is eccentric with respect to said journal, and drive means for simultaneously driving all of said first means so as to rotate, by the rotation of one of the first means, all the other first means, whereby the studs of the first means are located at a distance from the centre of the platen equal to the distance between the fixing apertures of the wheel to be balanced and the centre of said wheel; the improvement comprising arranging that one of said passages is coaxial with an apex which is common to all the polygons and said passages are all located on the same circumference of the platen, said means for driving said first means comprising a centre driving element mounted to be rotatable about said axis, and a positive mechanical connecting device being capable of coupling said driving element to each one of said first means, said positive mechanical connecting device comprising peripheral teeth on the driving element and complementary teeth on each one of said first means and meshing with the peripheral teeth, the number of teeth of the driving element being a common multiple of the numbers of angles of said polygons.

26. In a device for fixing vehicle wheels having fixing apertures on a balancing machine provided with a rotary shaft, comprising in combination: a platen provided in the centre thereof with means for fixing it on said shaft to rotate about the axis thereof and a series of passages respectively having axes parallel to said axis and located at the apices of at least two regular polygons, a set of first means each of which first means comprises a journal adapted to be engaged in one of the passages of the platen and a fixing stud which is eccentric with respect to said journal, and drive means for simultaneously driving all of said first means so as to rotate, by the rotation of one of the first means, all the other first means, whereby the studs of the first means are located at a distance from the centre of the platen equal to the distance between the fixing apertures of the wheel to be balanced and the centre of said wheel; the improvement comprising arranging that one of said passages is coaxial with an apex common to all the polygons and said passages are all located on the same circumference of the platen, said means for driving said first means comprising a centre driving element mounted to be rotatable about said axis, and a positive mechanical connecting device being capable of coupling said driving element to each one of said first means, said positive mechanical connecting device comprising peripheral teeth on the driving element and complementary teeth on each one of said first means and meshing with the peripheral teeth, each first means comprising a plate on which said journal and said stud are fixed in a manner to extend in parallel opposed directions and a gear wheel which is coaxial with the axis of the journal, meshes with the centre driving element and is integral with the plate, the plate being located at a different level with respect to said driving element and its associated gear wheel, said device further comprising on said centre driving element a circular abutment which is coaxial with said driving element and disposed at the same level as said plate in the mounted position of each one of said first means.

27. In a device for fixing vehicle wheels having fixing apertures on a balancing machine provided with a rotary shaft, comprising in combination: a platen provided in the centre thereof with means for fixing it on said shaft to rotate about the axis thereof an a series of passages respectively having axes parallel to said axis and located at the apices of at least two regular polygons, a set of first means each of which first means comprises a journal adapted to be engaged in one of the passages of the platen and a fixing stud which is eccentric with respect to said journal, and drive means for simultaneously driving all of said first means so as to rotate, by the rotation of one of the first means, all the other first means, whereby the studs of the first means are located at a distance from the centre of the platen equal to the distance between the fixing apertures of the wheel to be balanced and the centre of said wheel; the improvement comprising arranging that one of said passages is coaxial with an apex common to all the polygons and said passages are all located on the same circumference of the platen, said means for driving said first means comprising a centre driving element mounted to be rotatable about said axis, and a positive mechanical connecting device being capable of coupling said driving element to each one of said first means, said positive mechanical connecting device comprising a centre driving element constituted by a disc provided with radial notches disposed at angular distances apart of the passages of said platen, and each of said first means comprises a driving pin which is offset with respect to the journal of said first means and parallel thereto.

28. A device as claimed in claim 27, wherein said notches open onto the periphery of said disc.

* * * * *